United States Patent [19]

Fukuda

[11] Patent Number: 5,018,812

[45] Date of Patent: May 28, 1991

[54] OPTICAL SWITCHING DEVICE

[75] Inventor: Yoshimasa Fukuda, Saitama, Japan

[73] Assignee: Texas Instruments Incorporated, Dallas, Tex.

[21] Appl. No.: 430,099

[22] Filed: Oct. 30, 1989

Related U.S. Application Data

[63] Continuation of Ser. No. 196,915, May 20, 1988, abandoned.

[30] Foreign Application Priority Data

May 20, 1987 [JP]  Japan ................................. 62-122736

[51] Int. Cl.$^5$ .............................................. G02B 6/10
[52] U.S. Cl. .................................................. 350/96.14
[58] Field of Search ........................... 350/96.14, 96.34

Primary Examiner—William L. Sikes
Assistant Examiner—Robert E. Wise
Attorney, Agent, or Firm—William E. Hiller; N. Rhys Merrett; Melvin Sharp

[57]  ABSTRACT

An optical switching device having an organic thin film selectively enabling optical transmission and cut-off of infrared light of a predetermined wavelength by changing applied potential.

17 Claims, 3 Drawing Sheets

OPTICAL SWITCHING DEVICE

This application is a continuation of application Ser. No. 196,915, filed May 20, 1988, now abandoned.

BACKGROUND THE OF INVENTION

1. Field of the Invention

The invention relates to an optical switching device and, for example, to an optical switching device suitable for converting electrical information into optical signals and treating them.

2. Description of the Prior Art

For computers, the structure called Neumann-type is the mainstream, which comprises an input unit receiving information, a memory storing information, an arithmetic and logic unit for calculation and so on, an output unit outputting processed information to the outside of the computer, and a control unit operating these units according to a prescribed procedure, and the above respective units accomplish sequentially operations in prescribed order of the procedure.

Recently, a demand for high-speed operation of computers, particularly for high-speed processing of picture image and patterning, has been enhanced, and especially for treating two-dimensional information such as image process, the above sequential processing method can not fully meet the demand for high-speed processing.

In order to overcome this fault, an optical computer has been proposed, which use photon (light quantum) in place of electron flow (as information medium).

An optical switching device has also been recently manufactured (on an experimental basis), using materials, for example, liquid crystal, lithium niobate, gadolinium-gallium-garnet (GGG), gallium-arsenic, gallium-aluminium, and lead-lanthanum-zirconium-titanium alloy. In applying these optical switching devices to the above method, however, because of the structural problem, the dimensional problem in integrating, the difficulties in industrialization for its complicated structure and the problem in the access to materials, it is even said that there is no possibility of being put to practical use in the future. The switching response time of the switching device formed of the inorganic elements is in the range of nano-second (10-9 second) order, and therefore can not completely meet a demand for a quick response as to make superhigh-speed processing of information signals in an optical computer possible.

OBJECTS AND SUMMARY OF THE INVENTION

An object of the invention is to provide an optical switching device responding such quickly as making superhigh-speed processing of informations possible.

The invention relates to an optical switching device having an organic thin film able to selectively transmit and cut off infrared light with a prescribed wavelength, by changing voltage supplied.

BRIEF DESCRIPTION OF THE DRAWINGS

Other objects, features and advantages of the invention will appear more fully from the following detailed description thereof taken in connection with the accompanying drawings, wherein.

DESCRIPTION OF THE PREFERRED EMBODIMENTS

In the following, the preferred embodiments of the invention will be explained.

First, an organic thin film of the invention will be explained.

A thin film of an organic material (including a high molecular compound) has generally the characteristic of absorbing and cutting off infrared light with wavelength of the specific range. An organic thin film of a butyl rubber compound for example, sharply absorbs infrared light with wavelength of about 3.2 'micrometer' as shown with the solid line in FIG. 1. When this thin film is applied with potential by the chemical treatment as described later, the property is exhibited that absorption wavelength range of infrared light shifts as shown with the dotted line in FIG. 1.

The chemical treatment will be now described as follows.

Figure 1:
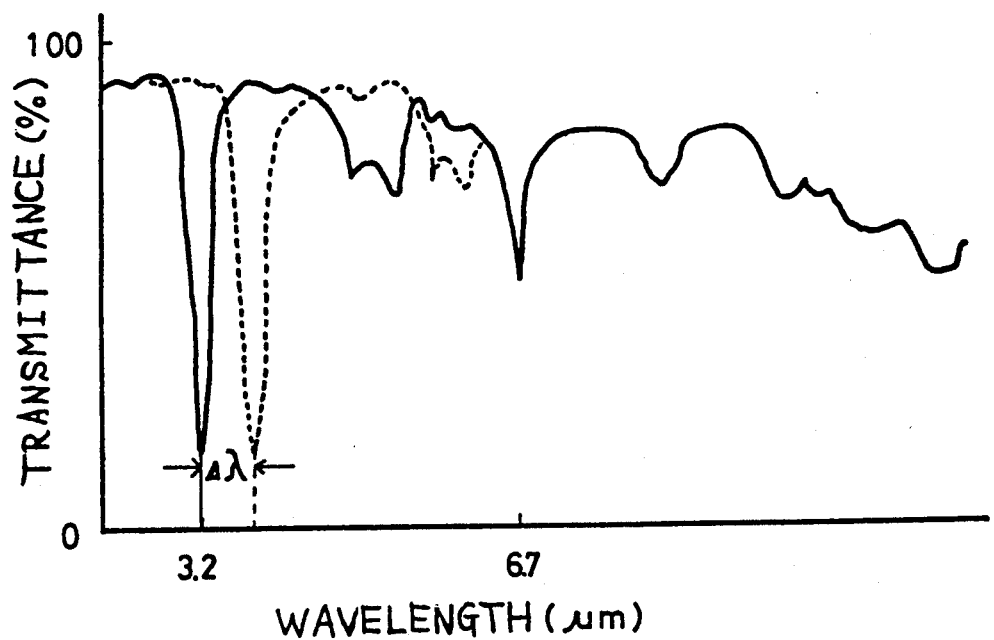
FIG. 1 is a graph showing an embodiment of relationship between wavelength and transmittance of infrared lights on an organic thin film.

On the process of synthesizing an organic thin film of butyl rubber compound, a functional group having large electro-negativity, for example,

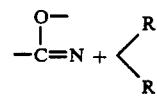

is introduced into butyl rubber molecule by mixing monomers having the above electro-negative troup with the starting material comprising isobutylene and isoprene to perform polymerization. It is supposed when applying potential to this thin film, the intramolecular polarization takes place such that N+ group is directed or attracted to the negative side of electrodes and O− group to the positive side with on the applied potential. This requires for very low energy. The intramolecular polarization shifts the wavelength range of infrared light transmitting this thin film by 'delta lambda' as shown in FIG. 1. The energy of potential for polarizing an organic compound as above, is very small. Therefore, the transmittance and cut-off of infrared light in the predetermined wavelength range to the selectively apply are performed with very high-speed response. The reason is considered as follows.

The above polarizing energy equals to "h'nu'" in conversion to the optical energy (h is the Planck's constant, and 'nu' is a frequency being a reciprocal number of wavelength 'lambda'). The polarizing energy shifting the wavelength of optical transmitting light by 'delta lambda' is very small for corresponding to the frequency ('nu') of the molecular level.

When the above organic thin film is too thick, the intensity of electric field to be imposed therein becomes weak insufficient to shift the wavelength at the minimum optical transmittance by a desired value which is enough to selectively assure the transmission and the cut-off of infrared light of a given wavelength. Alternatively, when the organic thin film is too thin, a response on switching becomes slow due to the increased electrostatic capacity of the thin film.

In addition to the butyl rubber, polymethyl methacrylate, poly-acrylonitrile, polyvinyl chloride etc. can be given as organic compounds having the characteristic as described above.

Processing of information can be accomplished with superhigh-speed response in the range of pico-second order, by positioning transparent (transparent for infrared light; hereinafter) electrodes on both sides of an organic thin film, and by selectively applying potential to the film to realize the optical transmission or the cut-off of infrared light of a predetermined wavelength to detect them, while uniformly irradiating the infrared light to the thin film. The above potential to the film is selectively applied by electrical signals depending on external information. Infrared light of wavelength of 0.75 'micrometer' can be preferably used as the above infrared light.

Figure 2:
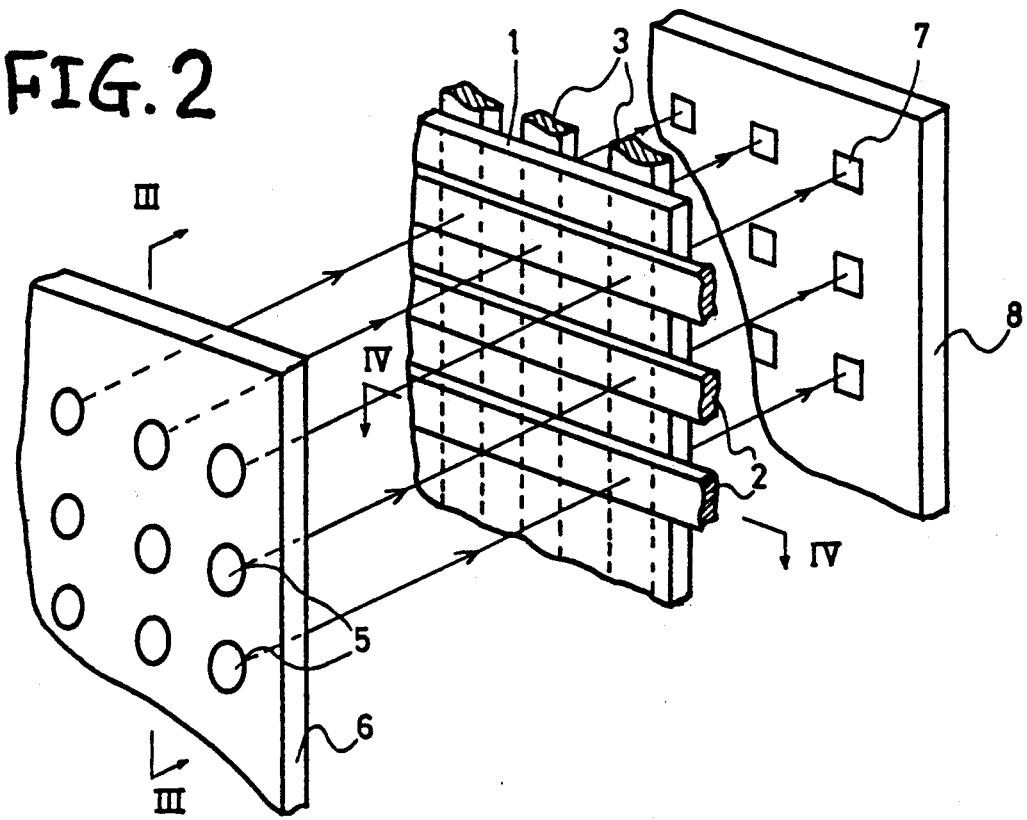
FIG. 2 is an enlarged partially perspective view showing main parts of an optical switching device.

FIG. 2 is a partially enlarged perspective view of a main part of an optical switching device according to the invention.

Figure 3:
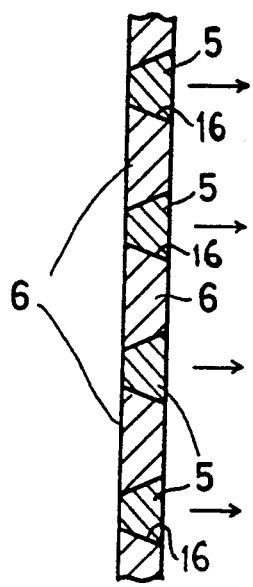
FIG. 3 is a cross-sectional view taken in the direction of the arrows along the line III—III of FIG. 2.

A first group of transparent stripe electrodes 2 (sixteen electrodes 2 in this embodiment) of fine patterns in parallel to each other are positioned in an X-direction on one side of a butyl rubber thin film 1 which is chemically treated as described above, and a second group of transparent stripe electrodes 3 (eight electrodes 3 in this embodiment) of fine patterns in parallel to each other are positioned in a Y-direction at a right angle to the X-direction on the other side of the film 1. As-In-Sb light emitting elements 5 which emits infrared light of about 3 'micrometer' wavelength to the crossing regions of the first electrodes 2 and the second electrodes 3, are opposingly place in a matrix with being supported by a light emitting element supporting board 6. The wavelength of infrared light emitted by an As-In-Sb light emitting element is normally in the range of 3.1 to 5.4 'micrometer', however, the light emitting elements 5 are adjusted to emit infrared light of about 3 'micrometer' wavelength by regulating the composition of As-In-Sb. The supporting board 6 has a plurality of cone-shaped through-holes 16 as shown in FIG. 3 being a cross-sectional view taken in the direction of the arrows along the III—III line in FIG. 2. The light emitting elements 5 are mounted in the through-holes 16 to be supported by the supporting board 6. On the other hand, light receiving elements 7 are supported by a light receiving element supporting board 8 in a matrix pattern to face respective cross regions of the electrodes 2 and the electrodes 3. Alternatively, the electrodes 2 and 3 are not necessarily formed as described above and can be shaped in a mesh pattern or arranged in the same direction.

Binary electric signals are selectively supplied to the electrodes 2 and 3 through an input portion (not shown), and when both electrodes 2 and 3 are (1), on the cross regions whereto potential (of 4 to 30 V) is applied, the thin film 1 represents the transmissivity profile of the infrared light shown with a dotted line in FIG. 1, and transmits the infrared light of 3.2 'micrometer'. In the other cross regions where either one of electrodes 2 or 3 is (0), and whereto any potential is not applied, the thin film 1 represents the transmission profile shown with a solid line in FIG. 1, and absorbs and cuts off 80–90% of irradiated infrared light of 3.2 'micrometer' wavelength. The light receiving elements 7 detect transmission and cut-off of the infrared light, and thus detected signals by the light receiving elements 7 are transformed to binary electric signals and then output from the optical switching device.

Figure 4:
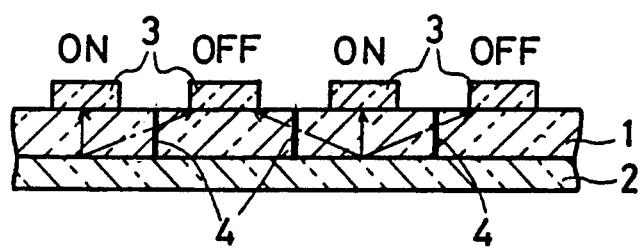
FIG. 4 is a cross-sectional view taken in the direction of the arrows along the line IV—IV of FIG. 2.

In the device of FIG. 2, since the cross regions of the electrodes 2 and 3 are positioned closely to each other at a short distance, a cross-talk will occur. In order to prevent a this, as shown in FIG. 4 being a sectional view taken in the arrows along the IV—IV line of FIG. 2, separators 4 made of insulating material are formed in the thin film between respective adjacent electrodes so as to electrically insulate respective adjacent cross regions from each other to cut off leakage current shown with a dash and dotted line.

Alternatively, wavelength of infrared light emitted by the light emitting elements may be set at 3.2 'micrometer'+'delta lambda' (See FIG. 1). In this case, when signal (1) is put into both electrodes 2 and 3 to supply potential on these cross regions, the thin film 1 absorbs and cut off the infrared light. On the other hand, when signal (0) is put into either one of electrodes 2 or 3 and any potential is supplied on the cross regions between the electrodes 2 and 3, the thin film 1 transmits the infrared light.

The optical switching device shown in FIG. 2 is be industrially produced preferably by the following processes (1)–(6), which will be explained below referring to FIG. 5.

(1) Set light emitting elements 5 for infrared light of In As(1-x)Sbx or the like on a light emitting element supporting board 6.
(2) Onto this, form stripe or belt-like optically transparent electrodes 2 made of single crystal silicon etc. (these are substantially transparent to the infrared light) in stripe pattern by the known photoetching.
(3) Onto this, coat organic compounds, such as butyl rubber, its prepolymer, and these solution in 5 to 20 'micrometer' thickness by spin coating method etc., and dry to form a thin film 1.
(4) Onto this, form belt-like transparent electrodes 3 made of single crystal silicon etc. in striped pattern by the known photoetching.
(5) Mount a light receiving element supporting board 8 having light receiving elements 7 upon the transparent electrodes 3.
(6) Include the above whole unit in a protecting package.

Figure 5:
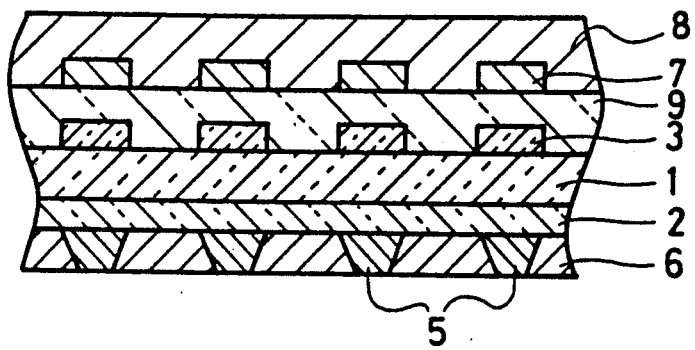
FIG. 5 is a partially enlarged cross-sectional view of an optical switching device.

Thus, the optical switching device having the structure shown in FIG. 5 is completed. In the figure, a numeral 9 indicates a transparent intermediate layer, and the protecting package is not shown in FIG. 5.

The optical switching device according to the embodiment shown in FIG. 2 to FIG. 5, as described above, has many advantages that; high integration is realized with having a plurality of electrodes 2 and 3; superhigh-speed processing can be performed using infrared light; power consumption is lowered; and the industrial production of the device is possible. These advantages can not be obtained by the device of the prior art. The optical switching device of the above embodiment makes it possible to realize a superhigh-speed processing computer.

Actually, the optical switching device according to the prior art was manufactured using an inorganic thin film, and it was operated under incidence of lase beam of 1.2 to 1.3 'micrometer' wavelength in switching response ranging nano-second order, while the optical switching device according to the embodiment has operated under the same condition as the prior art, switching response ranging pico-second order, which is extremely shorter (about 1/1000 times) than that of the conventional device.

For infrared lights of predetermined wavelength not exceeding 11 micrometer' can be used for the device by using Pb Cd S light emitting elements for far infrared lights or the like, in place of the above As In Sb light emitting elements as the light emitting elements 5. In applying such far infrared lights, materials of the organic thin film can be suitably selected for the wavelength, for example, polyacrylonitrile can be used for lights of 6-7 'micrometer' wavelength, polyvinyl pyrrolidone for lights of 7-9 'micrometer' wavelength, and butadiene rubber for lights of 10-11 'micrometer' wavelength, respectively.

Figure 6:
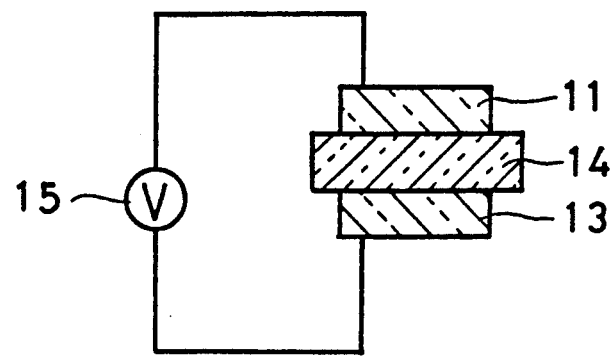
FIGS. 6 and 7 are partially enlarged cross-sectional views of respective optical switching devices according to other embodiments.

FIG. 6 shows a fundamental structure of an another optical switching device describing the invention.

An electrically conductive organic thin film 11 is formed on one side of a transparent base 14, and a second electrode 13 is formed on the other side of it. The conductive organic thin film 11 has function as both first electrode and organic thin film to selectively transmit and cut-off of infrared light (see FIG. 2). A numeral 15 in FIG. 6 represents a power source.

To be concrete, the belt-like conductive organic thin films (first electrode) 11 may be formed in parallel to each other to X-direction on one side of the transparent base 14, and the belt-like second transparent electrode 13 may be formed in parallel to each other to Y-direction on the other side of the transparent base 14.

In using the conductive organic thin film functioned as the organic thin film and also as the first electrode as shown in FIG. 6, it is not necessary to separately form the first electrode and the organic thin film, and therefore the manufacturing process of the device can be simplified.

It will be evident that various modifications can be made to the described embodiments without departing from the scope of the present invention.

For example, in FIGS. 2 and 5, the light emitting element supporting board 6 having the light emitting elements 5 and 1 or the light receiving element supporting board 8 having the light receiving elements 7 may be spaced from the laminated structure of the organic thin film 1 and electrodes 2 and 3. In this case, emitting and receiving of signals can be performed by irradiation of infrared lights between places positioned at a distance. For example, when the light emitting element supporting board 6 and/or the light receiving elements supporting board 8 with the laminated structure are respectively positioned in adjacent rooms with a window disposed therebetween, emitting and receiving of optical signal can be performed between the adjacent rooms through the window. Alternatively, when a first building and a second building face each other across a road, the light emitting element supporting board 6 and/or the light receiving element supporting board 8 and the above lamination may be formed separately in the building and the second building, as to face each other across the road. In this case, emitting and receiving of optical signals may be performed between the first building and the second building across the road.

The emitting and receiving of the signals in the prior art by laser beam using the inorganic thin film result in attenuation of light signals due to the shortness of its wavelength and therefore the range of optical communication is very narrow. On the contrary, in applying the optical switching device of the invention with infrared lights having longer wavelength, the attenuation of light signals is extremely small even as the distance of the optical communication is widened. Accordingly, the emitting and receiving of the signals are less restricted by the factor of a distance therebetween, in addition to the above advantages.

For long-distance optical communication, a mass information can be sent by setting many light emitting elements, many light receiving elements and many optical fibers corresponding to individual light receiving elements between the second electrodes and the light receiving element portion or the supporting board etc.

Figure 7:
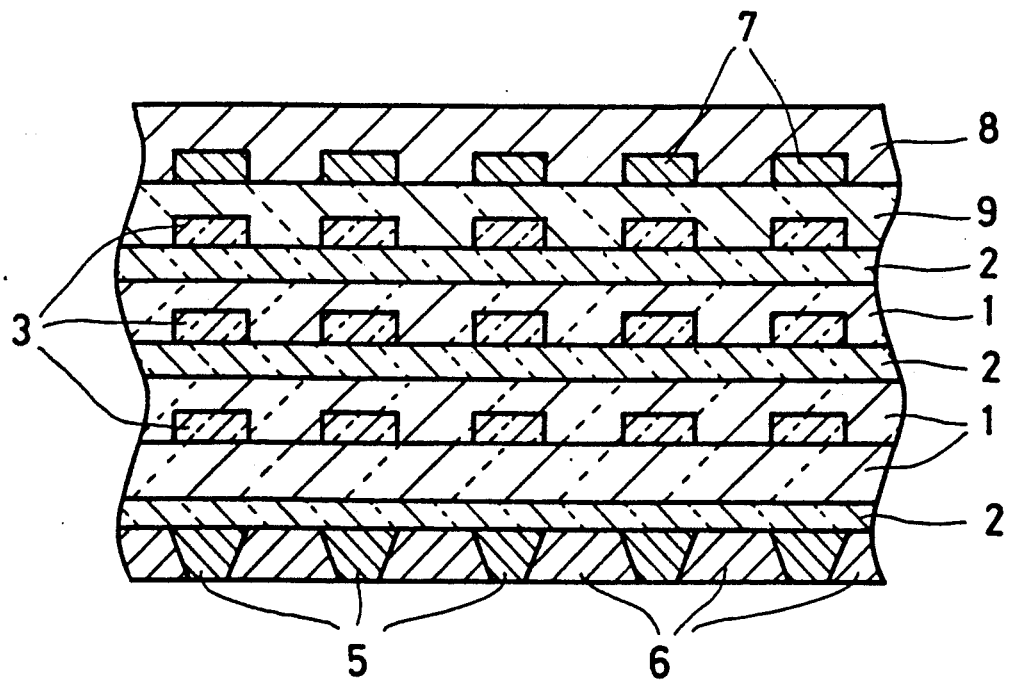

Alternatively, as shown in FIG. 7, a complex logic circuit utilizing infrared lights can be completed by forming plural layers of first electrodes 2, an organic thin film 1 and second electrodes 3 to be a multi-laminated structure. The optical switching device having this laminated structure is to provide a logic circuit wherein output is "0" at a cross region of two electrodes where any potential is not supplied by the signals through the first electrodes 2 and the second electrodes 3, and wherein output is "1" at a cross region of two electrodes where signals of the electrodes 2 and 3 generate the potential.

As described above, the optical switching device according to the invention is so constructed as to selectively enable transmission and cut-off of the infrared light of a predetermined wavelength by applying the organic thin film.

Consequently, the device can be operated with extremely quick response in the order of pico-second. Therefore, the information processing can be performed with high-speed being not possibly attained by the prior device, and realize superhigh-speed processing. Moreover, materials for the applied organic thin film are easily available and usable with no trouble, and industrial production of the optical switching devices can easily performed.

What is claimed is:

1. An optical switching device comprising:
   a thin solid membrane film of organic material having a functional organic chemical group incorporated therein to impart electro-negativity to the thin film of a degree sufficient to vary the optical transmission and cut-off of infrared light of a predetermined wavelength incident on said thin film in dependence upon the application of an electrical potential to the thin film;
   said thin film optically transmitting said infrared light of said predetermined wavelength in response to the application of an electrical potential at a first magnitude thereto and absorbing said infrared light of said predetermined wavelength in response to the application of an electrical potential at a second magnitude thereto.

2. An optical switching device as set forth in claim 1, wherein said thin film of organic material includes a butyl rubber compound.

3. An optical switching device as set forth in claim 2, wherein said functional organic chemical group incorporated in said thin film of organic material to impart electro-negativity thereto comprises:

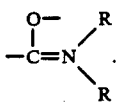

4. An optical switching device as set forth in claim 3, wherein said thin film of organic material is a polymerized composition of isobutylene and isoprene mixed with monomers of said functional organic chemical group.

5. An optical switching device as set forth in claim 1, wherein said thin film of organic material is polymethyl methacrylate.

6. An optical switching device as set forth in claim 1, wherein said thin film of organic material is polyacrylonitrile.

7. An optical switching device as set forth in claim 1, wherein said thin film of organic material is polyvinyl chloride.

8. An optical switching device as set forth in claim 1, further including first and second electrode means transparent to said infrared light of said predetermined wavelength and respectively disposed on the opposite sides of said thin film of organic material; and means operably connected to said first and second electrode means for applying an electrical potential to said thin film of organic material via said first and second electrode means.

9. An optical switching device as set forth in claim 8, wherein said means for applying an electrical potential comprises a source of binary digital information, said source of binary digital information providing a first electrical potential signal representative of a logic "1" and a second electrical potential signal representative of a logic "0";

said thin film of organic material transmitting said infrared light of said predetermined wavelength in response to the application of said first electrical potential signal representative of a logic "1" thereto, and absorbing said infrared light of said predetermined wavelength in response to the application of said second electrical potential signal representative of a logic "0" thereto.

10. An optical switching device as set forth in claim 9, further including infrared light detecting means disposed on the side of said thin film of organic material opposite from the side thereof to which said infrared light of said predetermined wavelength is incident and sensing the presence or absence of infrared light for detecting the transmission or cut-off of said infrared light of said predetermined wavelength by said thin film of organic material.

11. An optical switching device as set forth in claim 8, wherein said first and second electrode means comprises:

a first plurality of spaced parallel electrode strips of material transparent to said infrared light of said predetermined wavelength disposed on one side of said thin film of organic material; and a second plurality of spaced parallel electrode strips of material transparent to said infrared light of said predetermined wavelength disposed on the opposite side of said thin film of organic material, said second plurality of electrode strips being arranged in normal relation to said first plurality of electrode strips to define a matrix of cross-over regions on said thin film of organic material corresponding to the intersections between electrode strips of said first and second pluralities of electrode strips.

12. An optical switching device as set forth in claim 11, further including plural sources of infrared light of said predetermined wavelength disposed on one side of said thin film of organic material, each of said plural sources of infrared light being in focused registration with a respective location on said thin film of organic material corresponding to a cross-over region thereon as defined by the intersections between said electrode strips of said first and second pluralities of electrode strips on opposite sides of said thin film of organic material; and infrared light detecting means disposed on the side of said thin film of organic material opposite from the side on which said plural sources of infrared light are disposed, said infrared light detecting means having a plurality of target regions in respective registration with each source of infrared light and the corresponding cross-over region defined in said thin film of organic material by the intersections between said electrode strips of said first and second pluralities of electrode strips on opposite sides of said thin film of organic material.

13. An optical switching device as set forth in claim 12, wherein a plurality of separators of insulating material are provided in said thin film of organic material extending between respective adjacent electrodes on opposite sides of said thin film of organic material and located to electrically insulate respective adjacent cross-over regions in said thin film of organic material from each other.

14. An optical switching device as set forth in claim 12, wherein said thin film of organic material, said first and second pluralities of electrode strips mounted on opposite sides thereof, said plural sources of infrared light of said predetermined wavelength, and said infrared light detecting means comprise a monolithic integrated unit.

15. An optical switching device as set forth in claim 12, further including a stacked assembly of respective sets of thin films of organic material and first and second pluralities of electrode strips mounted on opposite sides thereof to define a plurality of individual optical switching units;

said plural sources of infrared light of said predetermined wavelength being disposed on one side of said plurality of individual optical switching units; and said infrared light detecting means being disposed on the opposite side of said plurality of individual optical switching units.

16. An optical switching device as set forth in claim 1, further including a base panel of a material transparent to infrared light of said predetermined wavelength;

said thin film of organic material being electrically conductive and forming a first electrode mounted on one side of said base panel; and a second electrode of a material transparent to infrared light of said predetermined wavelength mounted on the opposite side of said base panel.

17. A method of processing data comprising the steps of:

providing a thin film of organic material having a functional organic chemical group incorporated therein to impart electro-negativity to the thin film of a degree sufficient to vary the optical transmission and cut-off of infrared light of a predetermined wavelength by said thin film when subjected to an electrical potential of changing magnitudes;

directing a source of infrared light of a predetermined wavelength onto one side of said thin film of organic material;

applying one of a first and second electrical potential signals respectively representing logic "1" and logic "0" to said thin film of organic material;

shifting the transmissivity profile of said thin film of organic material with respect to said infrared light of said predetermined wavelength incident thereon in dependence upon the application of said one of said first and second electrical potential signals thereto;

detecting the transmission or cut-off of infrared light of said predetermined wavelength by said thin film of organic material in synchronism with the application of said one of said first and second electrical potential signals to said thin film of organic material and providing output signals indicative of such detection; and converting the output signals to binary electrical signals.

* * * * *